US 11,962,569 B2

(12) United States Patent
Kirchner et al.

(10) Patent No.: US 11,962,569 B2
(45) Date of Patent: Apr. 16, 2024

(54) HARDENING A COMMUNICATION DEVICE

(71) Applicant: Siemens Aktiengesellschaft, Munich (DE)

(72) Inventors: Michael Kirchner, Munich (DE); Benedikt Vamos, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 16/635,434

(22) PCT Filed: Aug. 1, 2018

(86) PCT No.: PCT/EP2018/070824
§ 371 (c)(1),
(2) Date: Jan. 30, 2020

(87) PCT Pub. No.: WO2019/025475
PCT Pub. Date: Feb. 7, 2019

(65) Prior Publication Data
US 2021/0092096 A1    Mar. 25, 2021

(30) Foreign Application Priority Data
Aug. 2, 2017  (EP) ..................................... 17184448

(51) Int. Cl.
*H04L 9/40*       (2022.01)
(52) U.S. Cl.
CPC ...... *H04L 63/0236* (2013.01); *H04L 63/1458* (2013.01)
(58) Field of Classification Search
CPC ...................... H04L 63/0236; H04L 63/1458
See application file for complete search history.

(56) References Cited

U.S. PATENT DOCUMENTS

2006/0133399 A1*  6/2006  Chang ..................... H04L 41/00
                                                  370/420
2006/0160395 A1*  7/2006  Macauley .............. H04Q 1/136
                                                  439/344
(Continued)

FOREIGN PATENT DOCUMENTS

CN          1798081 A      7/2006
CN        105323105 A      2/2007
(Continued)

OTHER PUBLICATIONS

Random House Webster's College Dictionary, Second Edition, p. 315 (Year: 1999).*
(Continued)

*Primary Examiner* — Huan V Doan
(74) *Attorney, Agent, or Firm* — Schmeiser, Olsen & Watts, LLP

(57) ABSTRACT

Provided are methods and apparatuses for hardening a communication device, which methods and apparatuses make it possible to identify a use of at least one port, by which port a request is submitted to the communication device by a message, and to output a signal for blocking the at least one port if, after a specifiable time period, either the use of the port in question is detected as low or no use of the port in question is detected. Embodiments can be used to harden communication devices in a production line, in a hospital and/or in a power supply network.

8 Claims, 1 Drawing Sheet

(56) References Cited

U.S. PATENT DOCUMENTS

| | | | |
|---|---|---|---|
| 2007/0261111 A1* | 11/2007 | Roberts | H04L 63/0218 726/11 |
| 2008/0263666 A1 | 10/2008 | Keohane et al. | |
| 2009/0043875 A1 | 2/2009 | Tajima | |
| 2009/0077666 A1* | 3/2009 | Chen | G06Q 10/0631 726/25 |
| 2011/0280137 A1* | 11/2011 | Bockwoldt | H04L 43/50 370/252 |
| 2013/0124729 A1 | 5/2013 | Ikeda | |
| 2015/0124614 A1* | 5/2015 | Alizadeh Attar | H04L 69/167 370/235 |

FOREIGN PATENT DOCUMENTS

| | | |
|---|---|---|
| CN | 101051938 A | 10/2007 |
| CN | 101364983 A | 2/2009 |
| CN | 101669347 A | 3/2010 |
| CN | 103888474 A | 6/2014 |
| EP | 1653664 A1 | 5/2006 |
| EP | 2169904 A1 | 3/2010 |
| EP | 3179672 A1 | 6/2017 |

OTHER PUBLICATIONS

Fielding R. et al: Hypertext Transfer Protocol—HTTP/1.1, Network Working Group, RFC 2616, Jun. 1999; 1999.
Defense Advanced Research Projects Agency Information Sciences Institute University of Southern California 4676 Admiralty Way Mari: "Internet Protocol Darpa Internet Program Protocol Specification; rfc791.txt", IETF Standard, Internet Engineering Task Force, IETF, CH, Sep. 1981 (Sep. 1981), XP015006773, ISSN: 0000-0003.
RFC4251 http://www.rfc-editor.org/pdfrfc/rfc4251.txt.pdf.
RFC 854 http://www.rfc-editor.org/pdfrfc/rfc8541.txt.pdf.
J. Postel, "Transmission Control Protocol," RFC 793, Internet Engineering Tast Force, Sep. 1981.
OSI—Open Systems Interconnection Model https://en.wikipedia.org/wiki/osi_model retrieved Aug. 2, 2017.
J. Postel, User Datagram Protocol, RFC 768, Internet Engineering Task Force, Aug. 1980 .
PCT International Search Report and Written Opinion of International Authority dated Oct. 22, 2018 corresponding to PCT International Application No. PCT/EP2018/070824 filed Aug. 1, 2018.

* cited by examiner

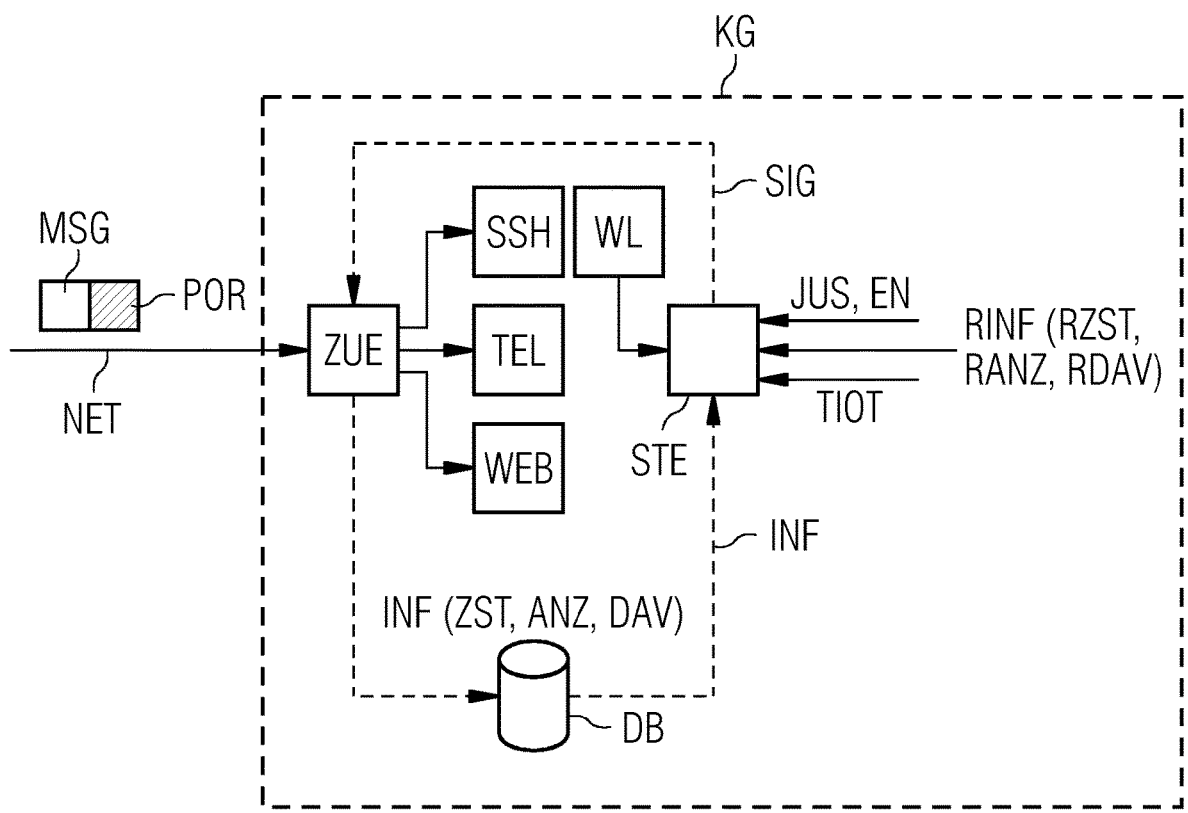

HARDENING A COMMUNICATION DEVICE

CROSS-REFERENCE TO RELATED APPLICATIONS

This application claims priority to PCT Application No. PCT/EP2018/070824, having a filing date of Aug. 1, 2018, which is based off of EP Application No. 17184448.3, having a filing date of Aug. 2, 2017, the entire contents both of which are hereby incorporated by reference.

FIELD OF TECHNOLOGY

The following relates to methods and apparatuses for hardening a communication device.

BACKGROUND

Increasing networking of devices, such as for example IT systems or automation components for industry 4.0, means that there is increasingly the risk of such devices being manipulated by targeted attacks.

According to one conventional art, it is known that two devices can interchange data in accordance with the OSI model (OSI Open Systems Interconnection model, see https://en.wikipedia.org/wiki/osi_model). To this end, the OSI model defines seven layers that perform specific tasks within the OSI model. As such, layer 4, also referred to as the transport layer, performs "functional and procedural tasks for transferring variable-length data sequences from a source to a destination via one or more networks, while maintaining a quality of service functions", see the aforementioned Wikipedia article. The conventional art discloses a TCP protocol (TCP Transmission Control Product, see RFC 793) and a UDP (UDP User Datagramm Protocol, see RFC 768) as layer-4 protocol.

Only a portion of the OSI layer model is explained in more detail below, said portion being useful for understanding embodiments of the invention when transferring data packets in accordance with the OSI layer model. In layer 3, the network layer, data packets are transmitted from one node to a next network node. The transmission of the data packets is performed using the IP protocol (IP Internet Protocol, RFC 791), for example. The layer-3 data packet comprises not only the parameters specific to layer 3 but also a layer-4 data packet in which, to process the layer-4 data packet, layer-4 addresses are specified. These layer-4 addresses are referred to as ports. A respective port allows data to be interchanged on an application-oriented basis independently of the properties of the communication network handled by layer 3. A layer-4 data packet thus comprises both a source port and a destination port in accordance with TCP or UDP, for example. The destination port indicates that port of a receiver of the data packet to which the layer-4 data packet is supposed to be transmitted. By contrast, the source port indicates that port of the sender of the data packet to which a response in accordance with the layer-4 data packet is supposed to be sent. Therefore, the ports for the sender and the receiver each describe services that the layer-4 data packet to be transmitted is supposed to process in the course of the communication between the sender and receiver or else between the receiver and the sender. To simplify a communication, standardization organizations have permanently assigned a respective service to some ports. As such, a request in accordance with the http protocol (http Hypertext Transfer Protocol, see RFC 2616) is standardized on a port 80, for example.

The indication of the port therefore generally enables a sender to send a receiver a request that the receiver is supposed to process for the sender. As such, a request from a web page on the Internet in accordance with port 80 can be made to a webserver, which then transmits the web page to the requesting device on a port 81. In general, it is also possible for the response to be sent on a port with a number between 1024 and 65535, also referred to as a TCP high port.

The providing, also referred to as opening, of one or more ports of the transport layer therefore allows communication partners to connect to one another in order to reciprocally use services.

During safety checks, however, the problem is found that, besides those ports that need to be contactable for the tasks of a specific system, numerous other ports are also open that are not at all or not necessarily required for the actual functionality of the system. These include for example:

a web interface, e.g. for retrieving a device status or help pages;
multiple different administration interfaces providing the same functionality in terms of content, such as e.g. Telnet, SSH (SSH RFC 4251);
ports that are merely intended for debugging and/or development purposes.

The aforementioned ports are often therefore activated to make the setup of a device or system as easy as possible or to keep a configuration complexity simple when configuration problems arise. Further, one reason may also be that developers and/or people who start up the installation simply overlook some ports that are open but not needed for operation.

This practice significantly simplifies an attack by a device or a system via a network. Further, it is relatively complex for people who set up the device or the system to keep ready all the ports required for startup and operation of the device-specific system and if need be to close them at a later time.

Ports can for example also be opened unintentionally on the basis of maintenance work, in order to install additional software or in order to be better able to track malfunctions in the system.

SUMMARY

An aspect relates to therefore that of specifying apparatuses, methods and uses that allow a device communicating with ports during its communication to be hardened against attacks via the network easily and efficiently.

Embodiments of the invention relate to a method for hardening a communication device, having the following steps:

identifying a use of at least one port via which a request is made to the communication device by means of a message;

outputting a signal to disable the at least one port if, after a prescribable period, either use of the respective port is detected as low or no use of the respective port is detected.

In this context, hardened means that an attack via the network is hampered in comparison with the known approach, i.e. the device is better protected from attacks. Communication device should be understood to mean any type of device that can receive messages and implement requests present in the messages, such as for example a conveyor belt or a robot on a production line, a patient system or an x-ray machine in a hospital or else a controller in a power supply system.

The reasons for one advantage of embodiments of the invention are that the steps allow hardening of the communication device to be achieved easily but effectively. Moreover, the chosen steps specifically avoid manipulation from outside, which means that the inventive steps themselves are also hardened against attacks.

In one advantageous configuration of embodiments of the invention, a time stamp from which use of the at least one port is detected is stored and use is detected as low if, after the prescribable period, the time stamp is detected to be older than a reference time stamp. This allows the erroneous configuring of a port to be easily detected and rectified by an administrator easily and reliably.

One development of embodiments of the invention can be provided by storing a number of identified requests from which use of the at least one port is detected and by detecting use as low if, after the prescribable period, the number is detected to be lower than a reference number. This also allows the erroneous configuring of a port to be easily and reliably detected and rectified by an administrator.

In a further advantageous configuration of embodiments of the invention, the following steps are performed: storing a data volume that is transmitted on detection of use of the at least one port and detecting use as low if, after the prescribable period, the data volume is detected to be lower than a reference data volume. This allows an open port to be easily and safely detected that is not being used and is thus closed to harden the communication device.

In a particular embodiment of the invention, the signal to disable the port is output if at least one further port from a reference list of ports that comprises the port and the at least one further port is open. This reliably allows at least one service to always remain addressable, and thus avoids a malfunction by the communication device if all services or a specific type of services are no longer contactable as a result of the associated ports being closed.

In a further advantageous refinement of embodiments of the invention, the period is chosen differently on the basis of a service addressable by the respective port. This increases a reliability of the implementation of embodiments of the invention, since specific services that are used more rarely still remain open in the event of relatively long inactivity, whereas services for which more frequent use is expected are closed more quickly in the absence of or in the event of little use.

In one development of embodiments of the invention, the prescribable period can be selected according to at least one of the following criteria:

a) The more difficult the service (DST) of the communication device addressable by the port is to manipulate, the longer the prescribable period is chosen to be.
This hardens the communication device further, since a communication device that is more easily accessible to an attacker is covered by a shorter prescribable period.
b) The more rights are needed to perform the service addressable by the port, the shorter the prescribable period is chosen to be.
This hardens the communication device further, since the hardening in the communication device is increased for services that can cause greater damage and thus require more rights for performance by reducing the prescribable period. More rights such as more access rights can also be required for accessing specific data in the network, this being able to promote drainage of sensitive data. Reducing the prescribable period reduces the risk of a loss of sensitive data in this case.
c) The higher an expectation value for the port being used in the request, the shorter the prescribable period is chosen to be.
This hardens the communication further, since taking into consideration the expectation value also allows a use of the communication device to be dependent. This also allows one or the other port to be closed early on an application-specific basis, since hardly any or no data traffic may be expected on these ports.
d) If the communication device has an IP address from the global Internet, the prescribable period is chosen to be longer than if the communication device obtains its IP address from a local intranet. This hardens the communication device further because it allows an attack potential as a result of absent security measures, such as for example a firewall, which may be absent when the communication device is connected directly to the Internet, to be reduced by means of shorter periods.

Embodiments of the invention further relate to an apparatus for hardening a communication device, having the following units:

assigning unit for identifying a use of at least one port via which a request is made to the communication device by means of a message;

control unit for outputting a signal to disable the at least one port if, after a prescribable period, either use of the respective port is detected as low or no use of the respective port is detected.

Moreover, in an optional development, the apparatus may further be configured by means of the assigning unit, the control unit and/or a database such that at least one step from one of the aforementioned method steps is performable.

The apparatus and its optional developments have the same advantages as the corresponding method steps.

BRIEF DESCRIPTION

Some of the embodiments will be described in detail, with reference to the following figures, wherein like designations denote like members, wherein:

FIG. 1 shows a schematic diagram of a communication device connected to a network in accordance with an embodiment.

Elements having the same function and action are provided with the same reference signs.

DETAILED DESCRIPTION

The FIGURE is used to explain embodiments of the invention in more detail on the basis of examples. For a more accurate understanding of the OSI layer model and the standardized approach to interchanging data packets in accordance with associated IETF RFC documents (IETF—Internet Engineering Task Force, see www.ietf.org; RFC—Request for Comments), reference is made to the introduction.

A communication device KG, such as for example control logic for a production line, is connected to a further computing unit (the further computing unit is not shown in the FIGURE) for the purpose of interchanging messages MSG via a network NET, such as for example LAN (LAN Local Access Network). The LAN connection is used to send the messages in the form of packets to the communication device KG. Such messages each signal a request to the communication device, the respective request being supposed to initiate specific services in the communication device, which are subsequently supposed for example to transfer information by means of one or more further messages to the further computing unit, such as for example help pages for operating the communication device. In addition, the request can also initiate a configuration in the communication device. So that the communication device knows which application is supposed to be started, the request comprises a respective port number POR, also referred to as port below, which is standardized, in part, in the prior art and hence assignable to specific services. By way of example, the port number 22 is assigned to the SSH service SSH (SSH The Secure Shell (SSH) Protocol Architecture, see RFC 4251), the port number 23 is assigned to a Telnet service TEL (see RFC 854) and the port number 80 is assigned to an http service WEB (http Hypertext Transport Protocol, see RFC 2616). By indicating the port, the request can therefore be forwarded by an assigning unit ZUE directly to the service SSH, TEL, WEB associated with the port.

On receiving the request, the assigning unit ZUE generates specific information INF pertaining to the port assigned to the identified request, such as for example a time stamp indicating the time at which the message MSG with the request was received by the assigning unit ZUE. The assigning unit ZUE forwards the generated information INF to a database DB for buffer-storage. Little by little, multiple requests reach the assigning unit ZUE, which generates applicable information for each request, forwards said information to the database and moreover informs the services SSH, TEL, WEB about the request so that these services can subsequently perform appropriate actions.

After a prescribable period TIOT of one day has elapsed, a control unit STE ascertains which of the ports that are open in the communication device are supposed to be disabled, and which of the ports are supposed to continue to be kept open. "Disabling" a port means that the assigning unit ZUE does not forward requests for a specific port to the respective service of the identified port. Conversely, "open" in this context means that a service continues to be contactable for a specific port.

For each piece of information associated with a respective port in the database DB, there is a piece of reference information. As such, for example the database stores a time stamp ZST with 27.03.2017, 12.13 hours, as information for port 22. This time stamp indicates the last time a request for the port 22 was received by the assigning unit ZUE. Further, there is for the port 22 the reference information in the form of a reference time stamp RZST, which is set to 27.03.2017, 8.15 hours. The reference time stamp indicates the maximum age the information in the database can be for the control unit STE to detect that requests for the respective service are currently still required and the port of the associated service should continue to be kept open. The control unit STE then checks whether the reference time stamp is more recent than the time stamp, i.e. RZST<ZST. Since the reference time stamp is not more recent than the time stamp, i.e. the time stamp is more recent than the reference time stamp, access to the service identified by the port is therefore required at present, which means that the port 22 is not disabled, i.e. is left open.

In a further embodiment of the above example, the information stored for the respective port in the database is a number ANZ of requests as information. The reference information prescribed is a reference number RANZ, the reference number indicating how many requests there need to be for the assigned port in order to prevent the port assigned to the request from being disabled. By way of example, a request was made to the port 23, i.e. to use the Telnet service, twice during the prescribable period TIOT of a one month. The "number" information of the port 23 is therefore equal to ANZ=2. The reference number set for the port 23 is a value RANZ=5. After the prescribable period of one week has elapsed, the control unit STE will therefore detect that the Telnet service was requested more rarely than required by the reference information, so that a signal SIG to disable the port 23 is sent to the assigning unit ZUE to disable the port 23.

In addition, the information assigned can be a data volume DAV, the data volume DAV indicating what volume of data, for example in bytes, is transferred via the port assigned in the identified request. The reference information assigned is a reference data volume RDAV, the reference data volume prescribing what volume of data, for example, in bytes, needs to be transferred to the port assigned via the identified request in order to detect that use of the service identified by the port is not detected as low and hence disabling of the port is prevented. If for example only a data volume of DAV=150 bytes has been transferred to a web service on a port 2000 during the prescribable period TIOT and if the reference data volume assigned is RDAV=1000 bytes, then, after the prescribable period has elapsed, the control unit STE detects that use of the port 2000 is low owing to DAV<RDAV, so that it can be inferred from this that the port 2000 is supposed to be disabled using a signal that needs to be generated. The disabling can be realized by virtue of messages with a request for a disabled port, i.e. also for a disabled service, being erased in the communication device without being forwarded to the respective service.

In the above embodiments of the different variants, it was indicated that the signal to disable a respective port is generated by the control unit and converted into disabling of the port directly by the assigning unit ZOE. In one variant of the above examples, the signal SIG to disable a respective port can also be transferred to an administrator, e.g. in the form of a screen output, an audible signal or in the form of a further message, e.g. as an MMS (MMS Multi Media Message). Using this signal, the administrator can then decide whether or not he communicates to the assigning unit ZUE that a specific port is supposed to be closed.

In the above examples, it was indicated that the communication device receives one or more requests to address one of its services. Embodiments of the invention are also applicable for the case in which no kind of requests are received by the assigning unit ZUE over the prescribable period for a prescribable service, e.g. the Telnet service on port 23. In this case, no information INF pertaining to the port 23 is stored in the database. When the open ports are checked, the control unit then detects that the service of the port 23 was not addressed in the prescribed period and, as no information was stored for this port, it is able to prompt the assigning unit to use the signal SIG to disable the port and hence the service Telnet.

In the above examples, the services addressable via the respective ports have each been considered separately. As a result, if various services are inactive for a longer period, the assigning unit may disable the ports for addressing these services, so that administration of the communication device may no longer be possible to a useful extent. In this regard, in one development of embodiments of the invention, there will be provision for a reference list WL in which the control unit STE can detect dependency between the different ports when deciding which of the ports are supposed to be disabled. By way of example, the reference list WL stores that at least one of the three services contactable by the ports 22, 23 and 81 needs to remain contactable. In this regard, the control unit can retrieve the information stored in the database for said ports and disable those ports that are used most rarely. By way of example, the service WEB on port 81 and the service SSH on port 22 were not addressed in the prescribed period, which means that no information pertaining to the ports assigned to these services is available in the database. The service TEL on port 23 was also not addressed again for a relatively long time. However, the control unit detects that although the service Telnet was not addressed again for a relatively long time, a request for the port assigned to this service was already identified at least once in the past. The control unit therefore decides that ports 22 and 443 are disabled, whereas port 23 continues to remain open.

In the above examples, the information pertaining to the respective ports was analyzed for a single prescribable period TOIT and then the associated ports were disabled if need be. In a modification of the examples, the prescribed period can also be selected individually for each port. As such, a longer prescribable period can be chosen for the case in which the service addressed by the port for the communication device can be manipulated with more difficulty. By way of example, a communication via the port 22 for the service SSH is transferred in encrypted fashion. An attacker from the outside is therefore hampered in disrupting this communication. This allows the prescribable period for the port 22 to be set to one week, whereas the prescribable period for the services on ports 23 and 81 is set to one day.

Further, the prescribable period for the respective port can alternatively or additionally be individually determined such that the more rights JUS are needed to perform the service addressable by the port, the lower the value of the prescribable period is selected to be. Further, the prescribable period can be chosen in each case to be shorter the higher an expectation value EW for use of the respective service is. Further, the prescribable period of the use of the communication device on an intranet or Internet can be set. As such, the prescribable period can be chosen to be higher when the communication device is used on the intranet, since a probability of a malicious attack by the respective service is lower than in the case of a communication device connected directly to the Internet. This can be realized by virtue of the prescribable period being chosen to be longer if the communication device has an IP address (IP—Internet Protocol) from the global Internet than if the communication device obtains its IP address from a local intranet. In accordance with the split of the IP addresses, prescribed IP address spaces are reserved for local or private use, such as e.g. IPv4 10.0.0.0 to 10.255.255.255, 172.16.0.0 to 172.31.255.255 and 192.168.1.1 to 192.168.255.255. In IPv6, these local and private addresses are called "Unique Local Addresses". Other IP addresses are enabled for global use, i.e. for the Internet. In a further configuration, the prescribable period can also be made dependent on whether only or predominantly machine-to-machine messages are sent in the communication device connected to the network, such as for example in a production installation. In this instance, the prescribable period can be set to be longer than if users load web pages from the Internet via the network NET, the web pages possibly being provided with defective components, such as cookies.

The units assigning unit, database and control unit can perform the method steps of embodiments of the invention in software, hardware and/or in a combination of software and hardware. In this regard, the method steps may be stored in the form of a machine-readable code in a memory for execution, the memory being connected to a processor and input and output modules via at least one bus for the purpose of interchanging data.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for hardening a communication device, having the following steps:
   identifying a use of at least one port via which a request is made to the communication device by a message; and
   outputting a signal to disable the at least one port if, after a prescribable period, either use of the respective port is detected as low or no use of the respective port is detected and if at least one further port from a reference list of ports including the port and the at least one further port is open,
   wherein the prescribable period is chosen differently based on a service addressable by the respective port and wherein the prescribable period is selected according to at least one of the following criteria:
   a) the more difficult the service of the communication device addressable by the port is to manipulate, the longer the prescribable period is chosen to be;
   b) the more rights are needed to perform the service addressable by the port, the shorter the prescribable period is chosen to be;
   c) the higher an expectation value for the port being used in the request, the shorter the prescribable period is chosen to be;
   d) if the communication device has an IP address from the global Internet, the prescribable period is chosen to be longer than if the communication device obtains its IP address from a local intranet.

2. The method as claimed in claim 1, wherein:
   storing a time stamp from which use of the at least one port is detected;
   detecting use as low if, after the prescribable period, the time stamp is detected to be older than a reference time stamp.

3. The method as claimed in claim 1, wherein:
   storing a number of identified requests from which use of the at least one port is detected;
   detecting use as low if, after the prescribable period, the number is detected to be lower than a reference number.

4. The method as claimed in claim 1, involving:
   storing a data volume that is transmitted on detection of use of the at least one port; detecting use as low if, after the prescribable period, the data volume is detected to be lower than a reference data volume.

5. An apparatus for hardening a communication device, having at least one hardware processor configured for:
   identifying a use of at least one port via which a request is made to the communication device by a message; and
   outputting a signal to disable the at least one port if, after a prescribable period, either use of the respective port is detected as low or no use of the respective port is detected and if at least one further port from a reference list of ports including the port and the at least one further port is open, wherein the prescribable period is chosen differently based on a service addressable by the respective port and wherein the prescribable period is selected according to at least one of the following criteria:

a) the more difficult the service of the communication device addressable by the port is to manipulate, the longer the prescribable period is chosen to be;

b) the more rights are needed to perform the service addressable by the port, the shorter the prescribable period is chosen to be;

c) the higher an expectation value for the port being used in the request, the shorter the prescribable period is chosen to be;

d) if the communication device has an IP address from the global Internet, the prescribable period is chosen to be longer than if the communication device obtains its IP address from a local intranet.

6. The apparatus as claimed in claim 5, wherein the at least one hardware processor is further configured for:

storing a time stamp from which use of the at least one port is detected; and detecting use as low if, after the prescribable period, the time stamp is detected to be older than a reference time stamp.

7. A computer program product, comprising a computer readable memory storing a computer readable program code, the computer readable program code comprising an algorithm that when executed by a computer processor of a computing system implements a method comprising:

identifying a use of at least one port via which a request is made to the communication device by a message; and outputting a signal to disable the at least one port if, after a prescribable period, either use of the respective port is detected as low or no use of the respective port is detected and if at least one further port from a reference list of ports including the port and the at least one further port is open, wherein the prescribable period is chosen differently based on a service addressable by the respective port and wherein the prescribable period is selected according to at least one of the following criteria:

a) the more difficult the service of the communication device addressable by the port is to manipulate, the longer the prescribable period is chosen to be;

b) the more rights are needed to perform the service addressable by the port, the shorter the prescribable period is chosen to be;

c) the higher an expectation value for the port being used in the request, the shorter the prescribable period is chosen to be;

d) if the communication device has an IP address from the global Internet, the prescribable period is chosen to be longer than if the communication device obtains its IP address from a local intranet.

8. The computer program product as claimed in claim 7, further comprising:

storing a time stamp from which use of the at least one port is detected; and detecting use as low if, after the prescribable period, the time stamp is detected to be older than a reference time stamp.

\* \* \* \* \*